United States Patent [19]
Feddersen et al.

[11] Patent Number: 4,959,006
[45] Date of Patent: Sep. 25, 1990

[54] APPARATUS RELATING TO A PREFORM WITH GEODESIC REINFORCEMENT RING

[75] Inventors: Frederick J. Feddersen, Londonderry; Jizu J. Cheng, Manchester, both of N.H.

[73] Assignee: FMT Holdings, Incorporated, Londonderry, N.H.

[21] Appl. No.: 441,065

[22] Filed: Nov. 22, 1989

Related U.S. Application Data

[63] Continuation-in-part of Ser. No. 420,143, Oct. 11, 1989, which is a continuation-in-part of Ser. No. 373,046, Jun. 28, 1989.

[51] Int. Cl.$^5$ .................... B29C 45/26; B29C 49/06
[52] U.S. Cl. .................................. 425/533; 249/122; 249/175; 264/513; 264/541; 264/318; 264/DIG. 33
[58] Field of Search ............... 264/DIG. 33, 513, 318, 264/541; 425/533; 220/70; 249/122, 175

[56] References Cited

U.S. PATENT DOCUMENTS

| | | | |
|---|---|---|---|
| 3,137,748 | 6/1964 | Makowski | 264/DIG. 13 |
| 3,191,225 | 6/1965 | Polka | 264/DIG. 33 |
| 3,950,468 | 4/1976 | Rainville | 425/533 |
| 4,307,137 | 12/1981 | Ota et al. | 264/511 |
| 4,330,579 | 5/1982 | Ota et al. | 264/DIG. 33 |
| 4,481,163 | 11/1984 | Ota et al. | 264/513 |
| 4,511,418 | 4/1985 | Takami et al. | 264/513 |
| 4,785,948 | 11/1988 | Strassheimer | 220/72 |
| 4,785,950 | 11/1988 | Miller et al. | 220/72 |

Primary Examiner—Willard Hoag
Attorney, Agent, or Firm—Davis, Bujold & Streck

[57] ABSTRACT

A mold-core rod combination for producing a plastic preform for forming blow molded plastic bottles which comprises: a neck portion defining an opening; a tubular sidewall portion depending therefrom; and an integral base structure depending from the tubular sidewall portion to a closed end; the preform having an outside wall face and an inside wall face with one of these in the base structure having integrally formed thereon a plurality of filets, extending longitudinally of the preform and defining a continuous reinforcing ring of varying thickness spaced from the closed end and circumscribing the base structure, wherein the filets decrease progressively in width and radial thickness at least from the reinforcing ring toward the closed end. The preform is capable of forming a blow molded plastic bottle with a bottom portion having a continuous reinforcing ring of circumferentially continuous radially extending alterations in wall thickness with a regularly undulating cross-section along the circumference. Preferably the filets are integral with the inside wall face.

11 Claims, 28 Drawing Sheets

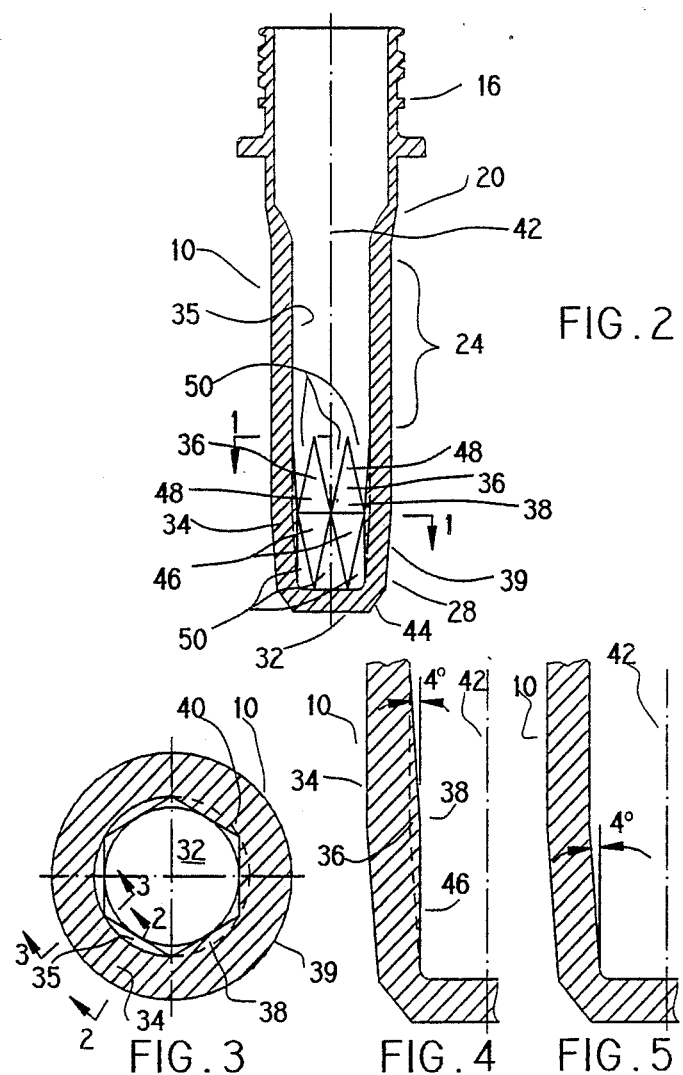

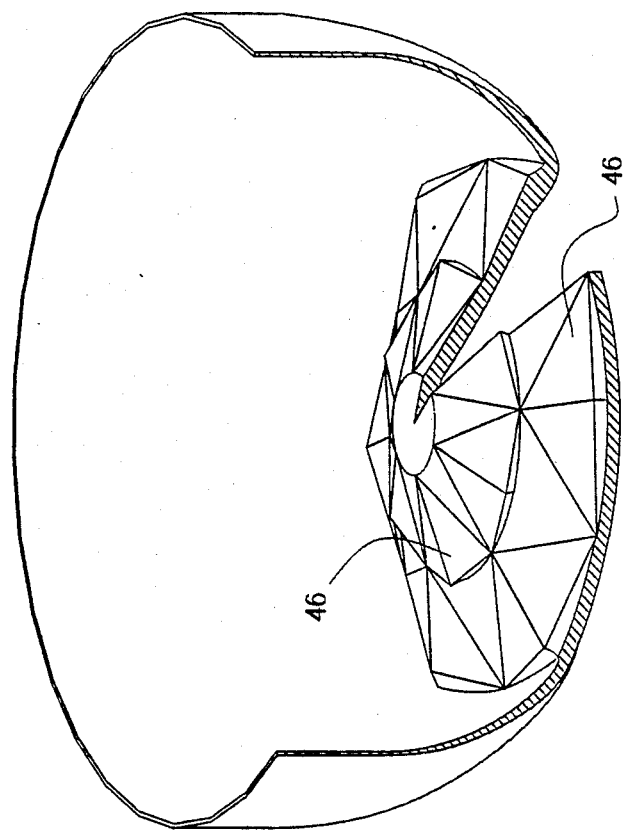

APPARATUS RELATING TO A PREFORM WITH GEODESIC REINFORCEMENT RING

This is a continuation-in-part of application, Ser. No. 07/420,143, filed Oct. 11, 1989 which is a continuation-in-part of application, Ser. No. 07/373,046, filed June 28, 1988.

This invention relates to an apparatus and process involving a preform having a geodesic reinforcement ring for use in blow molding, self-standing, polyester containers suitable for containing carbonated beverages.

Blow molded plastic bottles have largely replaced the heavier glass bottles previously used for soft drinks, and the like. In a bottle of plastic, the weight of the bottle itself is negligible as opposed to the weight of a glass bottle of similar capacity. The first plastic bottles were generally two piece bottles. The bottle comprises the pressure vessel portion and a base which permits the bottle to stand upright. The pressure vessel portion is typically of a tough, flexible plastic such as polyethylene terephthalate (PET) and has very thin sidewalls which become resiliently rigid for gripping due to the internal pressure created by the carbon dioxide gas in the soft drink liquid contained therein. The bottom is semispherical for the same pressure-containing reasons and, therefore, the separate base is required in order to have the bottle be able to stand by itself. The base is typically of a plastic such as polyethylene and is attached over the bottom of the pressure vessel portion with adhesive.

Presently, approximately 75% of the beverage containers produced worldwide are of the above-described two-piece construction. Because of the inert and nondegradable nature of the plastics used in the plastic beverage bottles and their thin-walled construction, there has been much interest recently in having them recycled rather than deposited in landfills along with other trash. With the increased usage of such plastic bottles, their presence in large quantities in landfills presents a genuine compaction problem. Moreover, the cost of the polyethylene terephthalate plastic employed in such bottles makes recycling a practical alternative to disposal. The two piece bottles on the other hand, create recycling problems. First, there are the two different kinds of plastics employed. There is no practical and cost effective way of separating the pressure vessel portion from the base so that the two plastics can be processed separately. Also, there is the problem of the adhesive used to fasten the two parts together. The adhesive is a contaminant to any recycled plastic materials. Wherefore, there has been much effort spent in attempting to develop a practical one piece plastic bottle and method for its manufacture.

An obvious approach to a plastic bottle intended for the holding of carbonated beverages was one having a so-called "champagne" base or bottom having a peripheral chime upon which the bottle sits surrounding an inward sloping portion which resists the internal pressure. The only problem with this approach using a unitary thickness plastic is that the bottom has a tendency to invert from the internal pressure. In an attempt to avoid that problem, numerous bottle configurations have been proposed incorporating integral pressure-resistant ribs into the bottom of the bottle. In this regard, typical prior art approaches to making pressure resistant plastic bottles can be seen with reference to the following U.S. Pat. Nos. 3,511,401 (Lachner); 3,598,270 (Adomaitis et al.); 3,643,829 (Lachner); 3,720,339 (Khetani); 3,881,621 (Adomaitis); 4,108,324 (Krishnakumar et al.); 4,134,510 (Chang); 4,334,627 (Krishnakumar et al.); 4,403,706 (Mahajan); 4,467,929 (Jakobsen et al.); 4,525,401 (Pocock et al.); 4,249,667 (Pocock et al.); 4,254,882 (Yoshino); 4,261,948 (Krishnakumar et al.); 3,137,748 (Makowski); 4,780,527 (Beck); and 4,785,948 (Strassheimer).

Of these, 3,137,748 (Makowski) and 4,780,527 (Beck) are of interest in that they teach the production of plastic bottles by blow molding techniques using varying wall thicknesses at critical points of stress. Of these, Makowski requires the use of split injection mold for preform production and is not directed to producing a pressure-resistant bottle. It is therefore of limited interest in application, particularly in view of the high costs associated with the use of split molds. Beck, however, is directed to the production of a self-standing container suitable for use with carbonated beverages and involves a preform design which does not require the use of a split mold for its production while at the same time the varying thicknesses required for the finished product are provided in the preform. In both Makowski and Beck, the thickened areas are continuous annular regions circumscribing the preform. While providing potential for some savings, this does not lend itself to the minimization of the amount of material required in the preform for the production of a satisfactory container.

Weight is a very important factor in the design of preforms for the production of self-standing containers, particularly those suitable for containing carbonated beverages. Reference to a half-liter bottle, a two-part bottle of the currently used type uses 24 grams of PET in the main container plus 5 grams of polyethylene in the separate base, and a quantity of adhesive for joining the base to the pressure vessel. At the present time, PET costs approximately $0.70 per pound and polyethylene, $0.50 per pound. When one considers the production of these containers are counted in the tens of billions per annum in the United States alone, it can be readily seen that even saving one gram per container can amount to a very significant saving in the cost of materials. For example, a saving of 1 gram of PET in each of one billion containers at the current price of PET will result in a saving in excess of $1,500,000. Additionally, a one-piece, self-standing container eliminates the substantial cost of producing a separate base, of assembling that base to a pressure container and possible savings from the ability to recycle the material.

By comparison with the two-part bottle, a ribbed base design, known as the supa-base (U.S. Pat. Nos. 4,261,948, 4,334,627, 4,525,401) utilizes, 29 grams of PET in a half-liter bottle. As will be appreciated from this, there is considerable incentive to produce designs of preform and the resulting blow molding container which utilize less material while retaining the necessary qualities of pressure containment, self-standing ability and stability together with the ability to injection mold the attendant preform in a one-piece mold and the relatively easy to machine injection mold/core pin arrangement. One such arrangement is the design disclosed in U.S. Pat. No. 4,785,948 (Strassheimer). This patent discloses a preform for forming blow molded plastic containers having circumferentially spaced, radially extending, continuous alterations in wall thickness provided by thickened portions, in the interior of the base of the preform, which extend toward the closed end of the bottom in the form of a plurality of flat faces extending axially of the preform and parallel to that axis whereby the cross-section of the preform in this base portion extending from a sidewall forming portion to the closed end will have a substantially constant cross-section, preferably with a hexagonal interior wall and a circular exterior wall. While this design may provide some savings in material usage by comparison with preforms having an annular thickened region circumscribing the preform for forming the base region of a container, the constant cross-section arrangement of this patent does not maximize the material savings possible as the thickened area of constant cross-section when blown to form the base of the container will result in thickened areas not only in the chime region where these are required, but also in locations radially removed from the chime region where the strength required from thickening is not required.

It is an object of the present invention to provide a core rod-mold combination for producing a preform for use in the blow molding of one-piece, self-standing plastic bottles for containing carbonated beverages which have bases of the champagne type capable of resisting inversion from internal forces while utilizing less material than current production designs by the utilization of the principles of triangulation exemplified in geodesic designs.

It is a further object of the present invention to provide a process using a preform capable of producing a self-standing container for carbonated beverages which in a half-liter size may utilize only 27.5 grams of PET.

According to the invention there is provided a plastic mold-core rod combination for forming an injection molded preform for producing blow molded plastic containers which comprises' a female preform mold having an interior surface and a core rod having an exterior surface together defining a mold cavity having the shape of the preform, said preform having a neck portion defining an opening; a tubular sidewall portion depending therefrom; and an integral base structure depending from the tubular sidewall portion to a closed end; said preform having an outside wall face and an inside wall face, with at least one of the inside wall face and the outside wall face of the base structure having integrally formed thereon a plurality of filets, extending longitudinally of the preform and contacting one another to define a continuous reinforcing ring of varying thickness spaced from the closed end and circumscribing the base structure, wherein said filets decrease progressively in width and radial thickness at least from said reinforcing ring toward said closed end, the preform being capable of forming a blow molded plastic bottle with a bottom portion having a continuous reinforcing ring of circumferentially continuous alterations in wall thickness with a regularly undulating cross-section along said circumference.

Also according to the present invention, there is provided a process for manufacturing a molecularly oriented plastic bottle comprising the steps of (1) providing an injection molded plastic preform having a neck portion defining an opening; a tubular sidewall portion depending therefrom; and an integral base structure depending from the tubular sidewall portion to a closed end; said preform having an outside wall face and an inside wall face, with at least one of the inside wall face and the outside wall face of the base structure having integrally formed thereon a plurality of filets, extending longitudinally of the preform and contacting one another to define a continuous reinforcing ring of varying thickness spaced from the closed end and circumscribing the base structure, wherein said filets decrease progressively in width and radial thickness at least from said reinforcing ring toward said closed end, the preform being capable of forming a blow molded plastic bottle with a bottom portion having a continuous reinforcing ring of circumferentially continuous alterations in wall thickness with a regularly undulating cross-section along said circumference; (2) positioning said preform in a stretch/blow mold; and (3) stretch/blowing said preform in said blow mold to form a finished bottle.

BRIEF DESCRIPTION OF THE DRAWINGS

FIG. 2 is a cross-sectional elevation of the entire preform illustrated in part, in FIG. 1;

FIG. 3 is a staggered cross-section on section line 1—1 of FIG. 2;

FIG. 4 is a fragmentary cross-section on section line 2—2 of FIG. 3;

FIG. 5 is a fragmentary cross-section on section line 3—3 of FIG. 3;

FIG. 54 is a fragmentary partially sectioned perspective view of interior of the base of the bottle when made from a preform of the eleventh embodiment;

Figure 1:
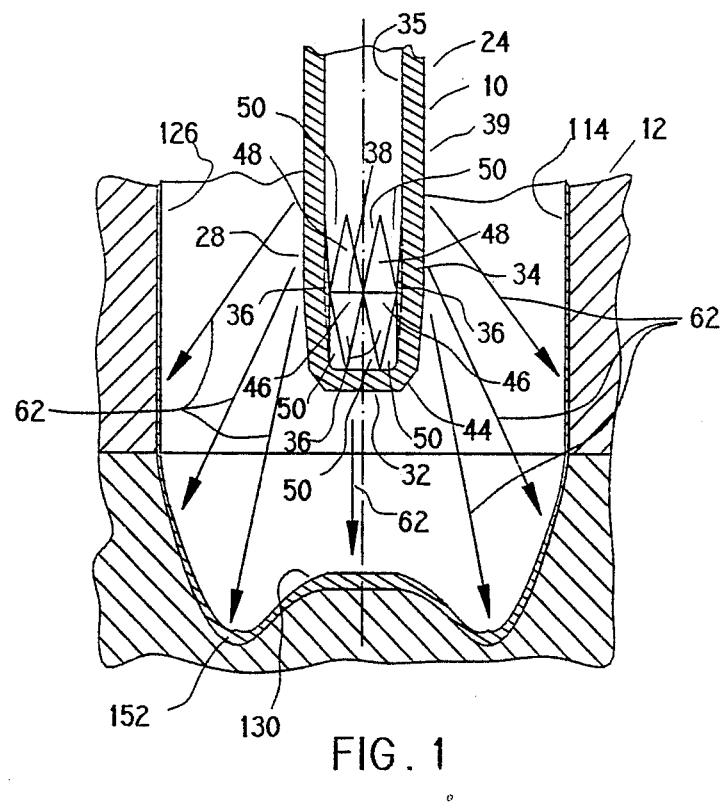
FIG. 1 is a cross-section of the base portion of a preform in accordance with the first embodiment of the present invention shown in an associated portion of a blow mold.
Figure 6:
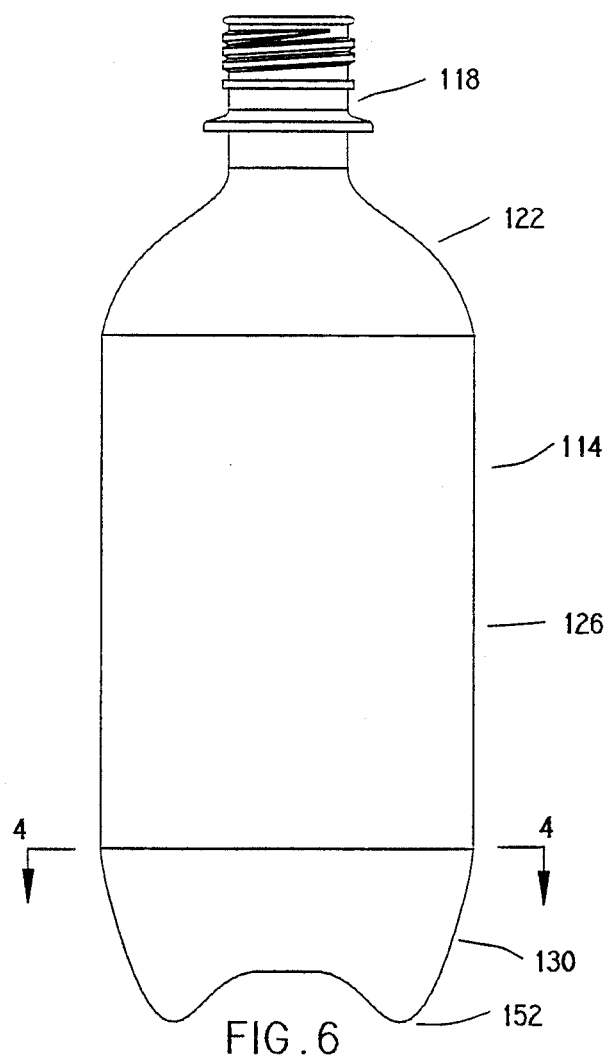
FIG. 6 is an exterior elevation of a bottle when made from a preform in accordance with the first embodiment in a blow mold as partially illustrated in FIG. 1.
Figure 7:
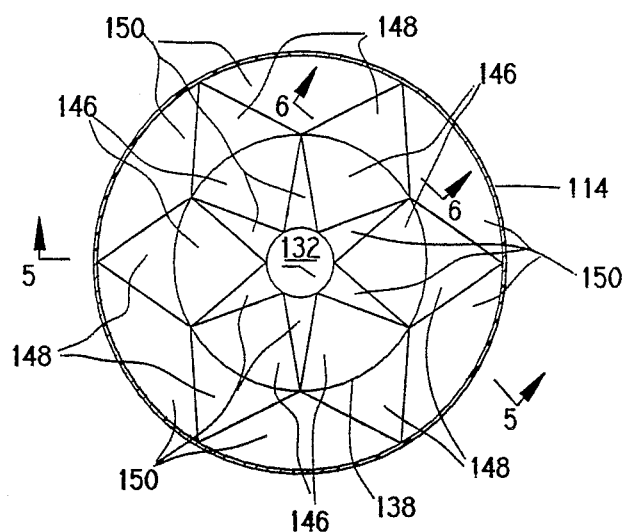
FIG. 7 is a sectional plan view on section line 4—4 of FIG. 6.
Figure 8:
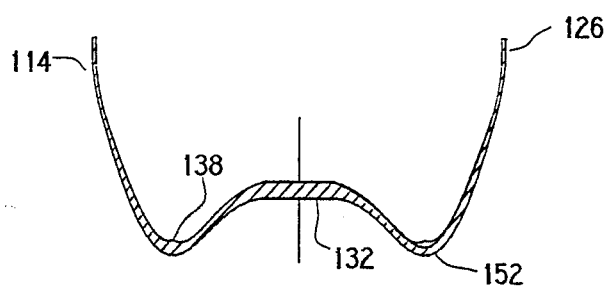
FIG. 8 is a staggered sectional elevation on section line 5—5 of FIG. 7.
Figure 9:
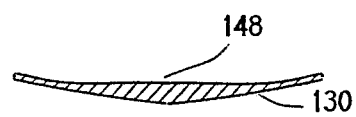
FIG. 9 is fragmentary cross-section on section line 6—6 of FIG. 7.
Figure 10:
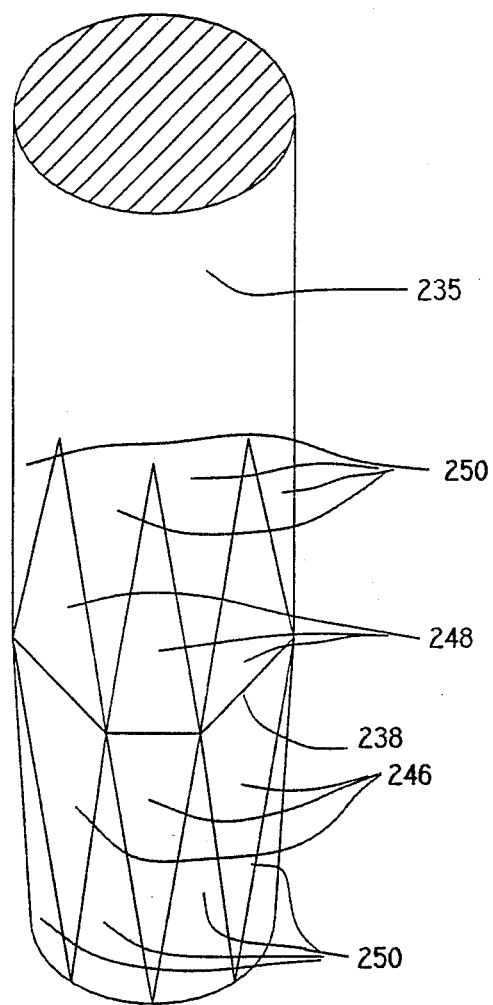
FIG. 10 is isometric view of the end portion of a core pin used in the injection molding of the preform of the first embodiment.
Figure 11:
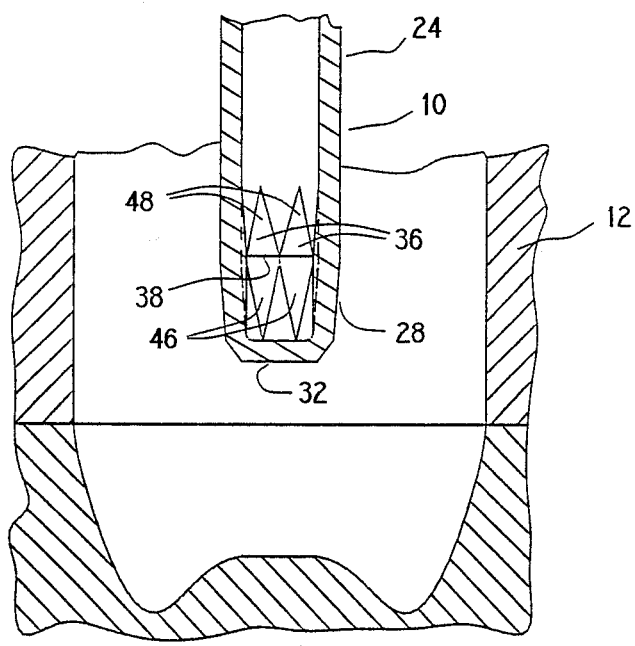
FIG. 11 is a cross-sectional elevation of a preform in accordance with a second embodiment of the present invention shown in the base portion of a blow mold.
Figure 12:
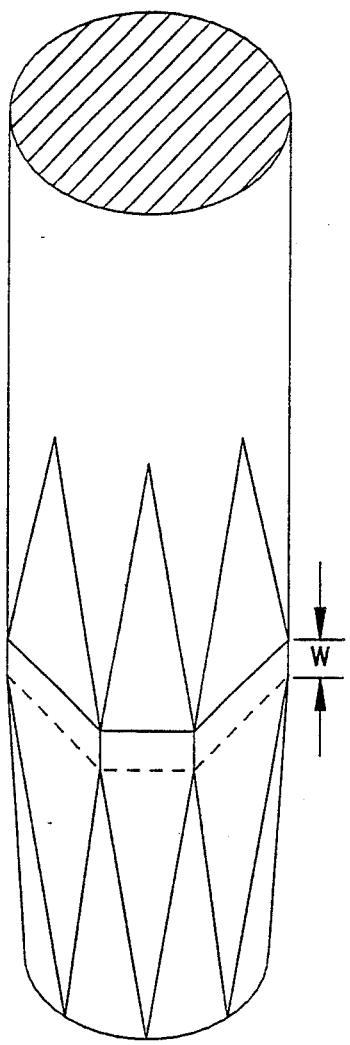
FIG. 12 is an isometric view of the base portion of a core pin used in the injection molding of a preform as illustrated in FIG. 11.
Figure 13:
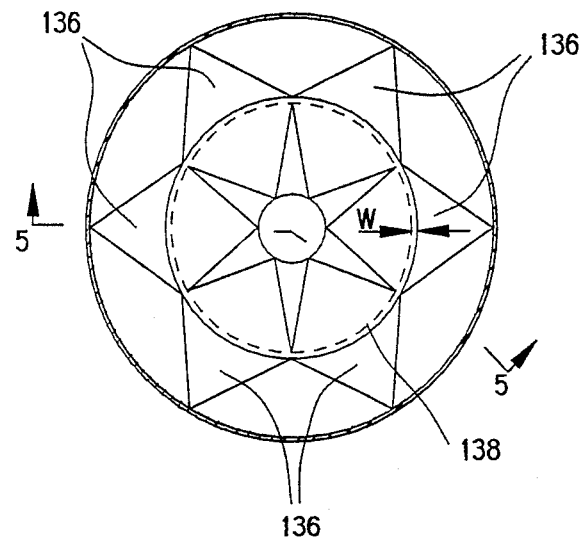
FIG. 13 is a sectional plan view of a bottle made from a preform in accordance with the second embodiment on a section line similar to section line 4—4 of FIG. 6 relative to the first embodiment.
Figure 14:
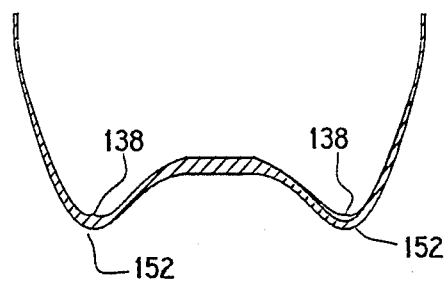
FIG. 14 is a partial elevation on staggered section line 5—5 of FIG. 13.
Figure 15:
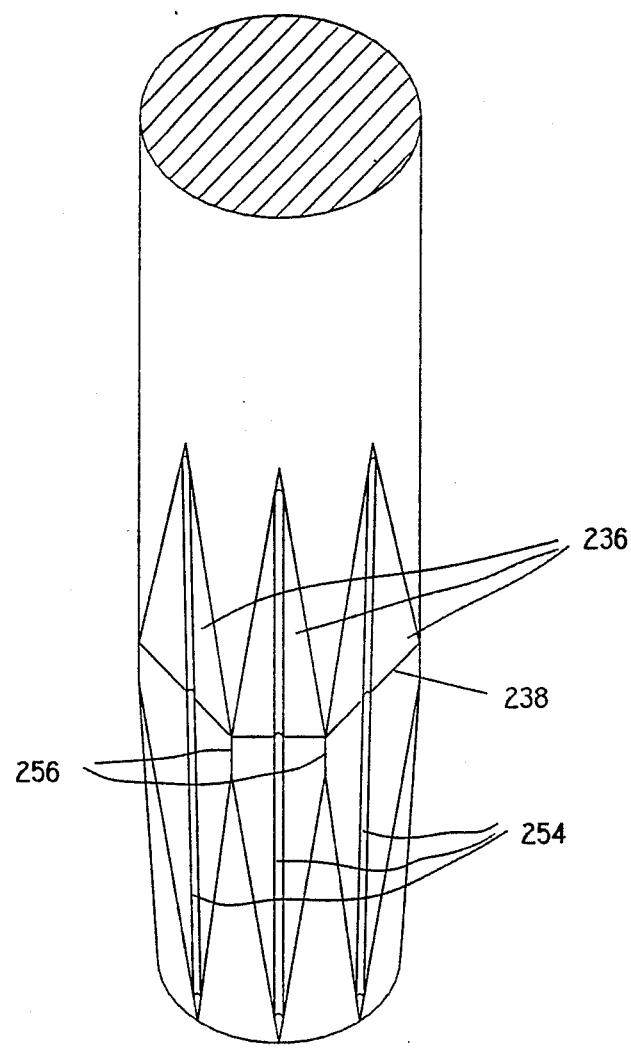
FIG. 15 is an isometric view of the base portion of a core pin used in the injection molding of a third embodiment of the preform according to the present invention.
Figure 16:
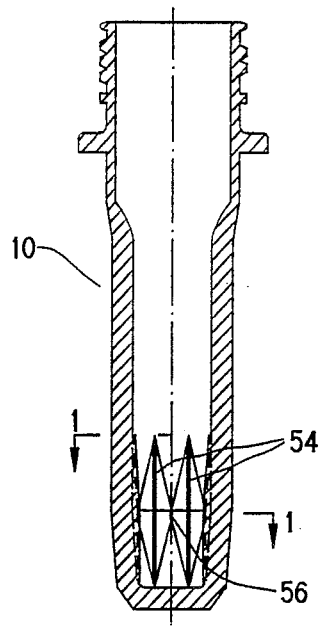
FIG. 16 is a cross-sectional elevation of the entire preform of the third embodiment.
Figures 17, 18, 19:
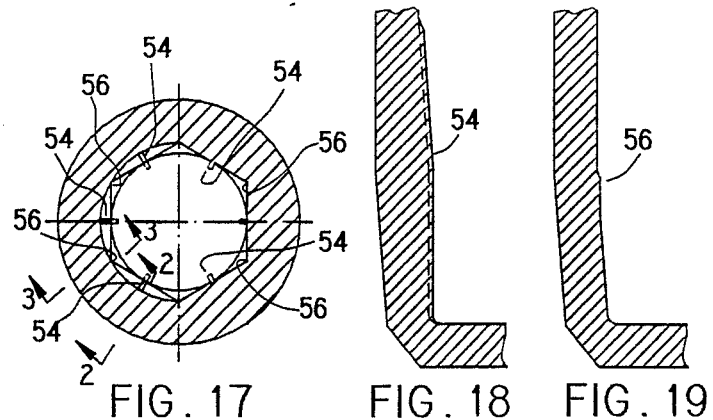
FIG. 17 is a staggered cross-section on section line 1—1 of FIG. 16.
FIG. 18 is a fragmentary cross-sectional elevation on section line 2—2 of FIG. 17.
FIG. 19 is a fragmentary cross-sectional elevation on section line 3—3 of FIG. 17.
Figure 20:
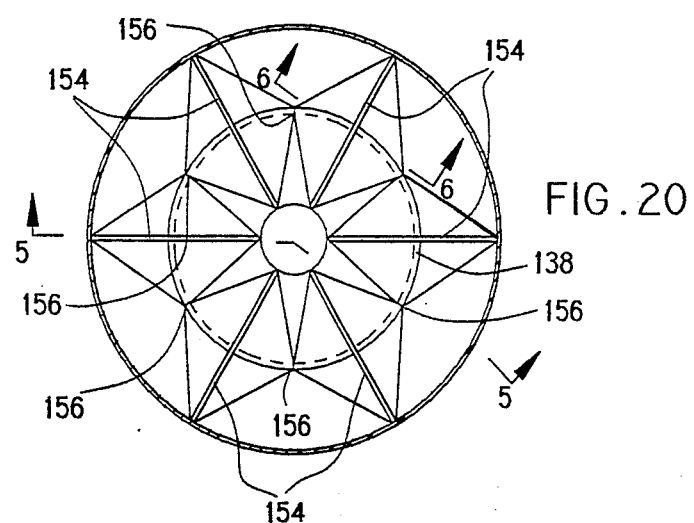
FIG. 20 is a sectional plan view of a bottle when made from a preform of the third embodiment taken on a section line similar to section line 4—4 of FIG. 6 relative to the first embodiment.
Figure 21:
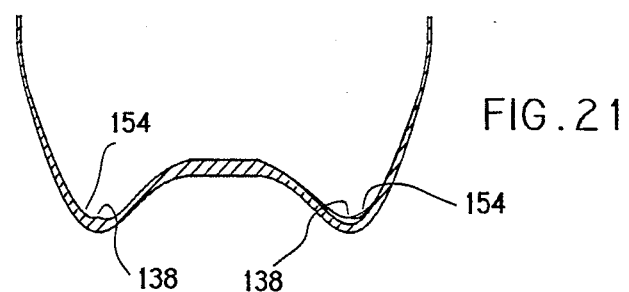
FIG. 21 is a partial sectional elevation on staggered section line 5—5 of FIG. 20.
Figure 22:
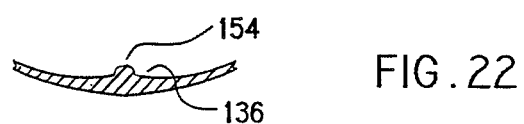
FIG. 22 is a fragmentary cross-section on section line 6—6 of FIG. 20.
Figure 23:
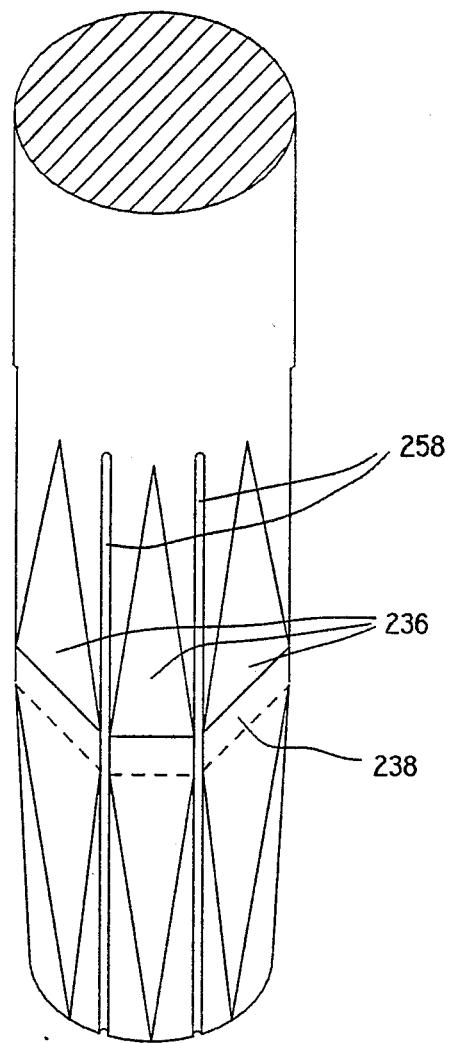
FIG. 23 is an isometric view of the base portion of a core pin for use in the injection molding of a preform in accordance with a fourth embodiment of the present invention.
Figure 24:
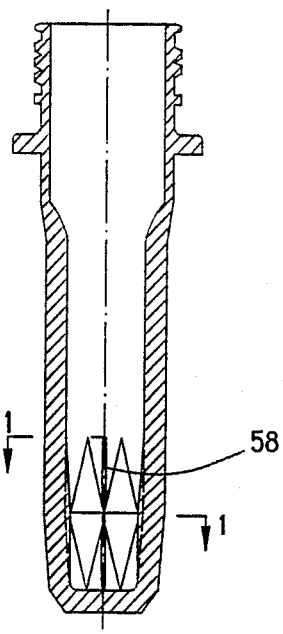
FIG. 24 is a cross-sectional elevation of the entire preform according to the fourth embodiment.
Figures 25, 26, 27:
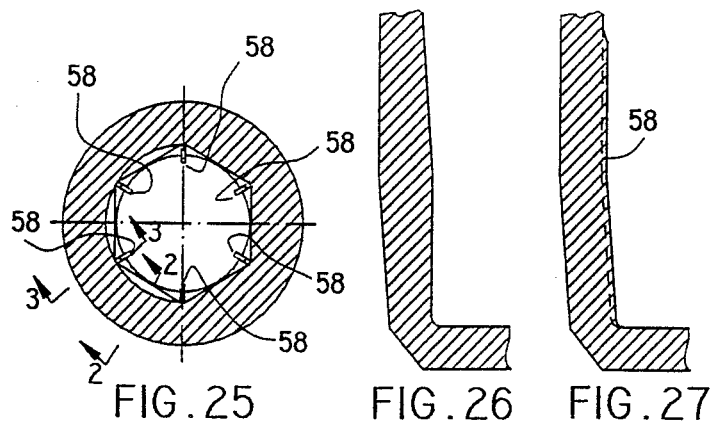
FIG. 25 is a sectional plan view on staggered section line 1—1 of FIG. 24.
FIG. 26 is a fragmentary cross-sectional elevation on section line 2—2 of FIG. 25.
FIG. 27 is a fragmentary cross-sectional elevation on section line 3—3 of FIG. 25.
Figure 28:
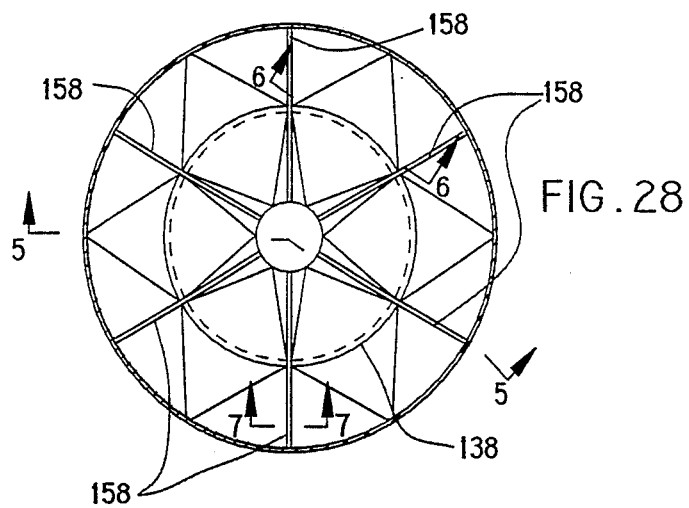
FIG. 28 is a sectional plan view of a bottle when made from a preform in accordance with the fourth embodiment taken on a section line similar to section line 4—4 of FIG. 6 relative to the first embodiment.
Figure 29:
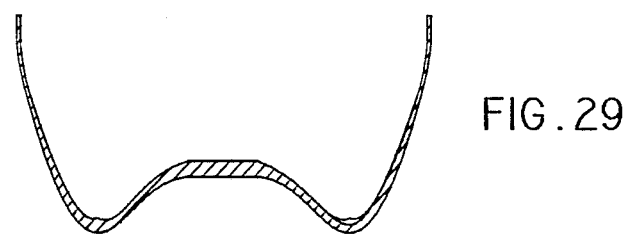
FIG. 29 is a partial sectional elevation on staggered section line 5—5 of FIG. 28.
Figures 30, 31:
FIG. 30 is a fragmentary cross-section on section line 6—6 of FIG. 28.
FIG. 31 is a fragmentary cross-section on section line 7—7 of FIG. 28.

The present invention is directed to a preform for a free-standing, one piece plastic bottle, preferably of PET (polyethylene terephthalate), for carbonated beverages having a champagne bottle type shaped base of controlled thickness to provide an annular chime to provide stable upright standing ability wherein the thickness of the bottom is controlled to provide adequate resistance to internal pressure, that thickness being derived from a varying thickness in the preform. More particularly, the base of the present invention incorporates an integral geodesic ring that runs horizontally of the bottle in the hoop direction. The reinforcing ring is placed in a location within the base of the bottle that has a moment arm trying to invert the base and provides sufficient strength to withstand that moment arm and keep the push up of the bottom intact. A feature is that the shape of the preform's interior and exterior walls are ever decreasing in diameter from the neck to the base so that it may be easily removed from a suitable core and injection mold cavity thereby avoiding the need for a split mold as in the Makowski teaching.

Referring first to FIGS. 1 through 10, a first embodiment of the present invention consists of a preform 10 injection molded from PET for blow molding, in a blow mold 12, to produce a bottle 114 of a self-standing champagne bottle type base suitable for carbonated beverages and having a half-liter capacity with a weight of 27.5 grams. The preform consists of a neck portion 16 from which the neck 118 of the bottle is produced, a shoulder portion 20 from which the shoulder 122 of the bottle is blown, a sidewall portion 24 of substantially constant thickness from which the sidewall 126 of the bottle is blown and a base structure 28 terminating in a closed end 32 from which the base 130 of the bottle is blown. The neck portion 16 is connected to the sidewall portion 24 by way of the shoulder portion which forms a transition between the neck portion (which remains substantially unchanged during the blow molding process) and the sidewall portion which, after temperature conditioning, is stretched longitudinally in the blow mold before the blowing operation takes place in most cases. In the shoulder portion 20, the thickness of the material increases progressively from the neck portion to the sidewall portion, which is of a substantially constant thickness and diameter. The sidewall portion 24 terminates remote from the shoulder portion 20 at a transition to the base structure which itself terminates in the closed end 32, from which the center of the base of the bottle is produced. The base structure between the sidewall portion and the closed end consists of an annular wall portion 34 on the interior wall face 35 of which are integrally formed a plurality of longitudinally extending reinforcing filets 36, six in number in this embodiment, symmetrically disposed around the interior wall face 35 of wall portion 34 in contact with one another to form a geodesic reinforcement ring 38 defined on its outside by the circular wall face 35 of the wall portion 34 and on its interior by a hexagonal line 40 symmetrically disposed about and normal to the axis 42 of the preform. Apart from the filets 36, the preform is of a circular cross-section, normal to axis 42, having interior and exterior surfaces which are of ever decreasing diameter from the neck to the base. This ever decreasing diameter need only be sufficient to facilitate removal of the preform from the mold, in which it is injection molded, and the associated core pin. The filets 36 extend from the transition of the base portion with the sidewall portion to the closed end of the preform which consists of a substantially flat end lying transversely of the axis 42 and joined to the base structure 28 by a rapid transition 44 which may be curved or angled depending on the particular preform design and blow mold configuration. The wall thickness of the sidewall portion 24 and the wall portion 34 of the base portion are substantially the same with the filets 36 forming a variable thickness reinforcement ring 38 circumscribing the interior of the base structure of the preform. Toward the closed end 32 from adjacent the reinforcement ring 38, the interior and exterior wall faces 35, 39 of the wall portion 34 taper inwardly toward the axis 42 at an angle of 4 degrees. The exposed surfaces of the filets 36 comprise triangular flat surfaces or facets 46 extending from the reinforcement ring 38 to the closed end 32 substantially parallel to the axis 42 whereby the filets are of ever decreasing thickness and width from the reinforcement ring 38 to the closed end 32. Similar triangular flat surfaces 48 extend from the reinforcement ring 38 to the transition with the sidewall portion 24 with these angled outwardly from the reinforcement ring 38 at an angle of 4 degrees to the axis 42 thereby to cause each filet to taper downwardly both in thickness and width from the reinforcement ring 38 to the transition with the sidewall portion 24. In the area of the triangular surfaces 48, both the interior and exterior wall faces 35, 39 of the wall portion 34 are essentially cylindrical.

Portions 50 of the interior wall face 35 of the wall portion 34 are exposed between the triangular surfaces 46 and 48. The triangular surfaces 46 and 48 are flat and the filets 36 contact one another only at the reinforcement ring 38 there to form straight edges or ridges. This contact between the filets 36 coupled with the material provided by the filets defines the reinforcement ring and the reinforcement ring acts as a geodesic structure resulting from continuous nature of the ring and the triangulation of forces operating both circumferentially and longitudinally within the filets around the reinforcement ring. The tapering down of the filets in both directions away from the reinforcement ring longitudinally of the preform serves to provide the necessary additional strength either side of the reinforcement ring for preventing the champagne base of the bottle from inverting under the influence of pressure of a beverage contained therein.

It will be appreciated that due to a curvature of the interior wall face 35 the filets will taper down progressively, continuously and gradually circumferentially from the radially thickest region to the circumferential location of their point contact meeting along the reinforcement ring.

In the figures illustrating the bottle, the portions of the bottle derived from and corresponding to various portions of the preform are identified by reference numbers which are exactly 100 higher than the reference numerals for the corresponding portions in the figures illustrating the preform. This distinction will be utilized throughout the description of the other embodiments. Additionally, reference numerals used in the other embodiments will be the same as those used with reference to the first embodiment where the features concerned are similar.

Reference numerals identifying features on the various embodiments of core pin will be exactly 200 higher than the reference numerals used with respect to the corresponding features of the associated preform.

With reference now to the second embodiment illustrated in FIGS. 11 through 14, the geodesic reinforcement ring 38 here has a discrete width W resulting from an overlap of the triangular surfaces 46 whereby the circumferential width of the surfaces 46 is somewhat truncated. The triangular surfaces 48 in this second embodiment are essentially identical to those of the first embodiment. By virtue of this the reinforcement ring 38 with a discrete width, a chime reinforcement ring 138 will have a discrete width which will render less critical the placement of that reinforcement ring relative to the chime 152 for satisfactory performance of the bottle.

The third embodiment as illustrated in FIGS. 15 through 22 is quite similar to that of the second embodiment. However, in this third embodiment the filets 36 have superimposed on them ribs 54 extending longitudinally of the preform for the full longitudinal extent of the filets. The purpose of these ribs 54 is to provide additional control of the longitudinal stretching of the preform in preparation for the introduction of gas under pressure for the blow molding operation and provides additional strength. By the use of these ribs, the desired relatively large longitudinal stretching of the sidewall portion 24 can take place while the desired restriction of the longitudinal stretching of the base structure 28 is facilitated. Additionally, in this third embodiment, the junction between filets in the region of the reinforcement ring 38 is filled by a small filet 56 to provide a gently curved concave junction between filets A variation of the third embodiment is found in the fourth embodiment illustrated in FIGS. 23 through 31 in which ribs 58 are formed in the interior surface of the wall portion 34 between filets 36. These ribs 58 which extend longitudinally for the full extent of the filets 36 serve exactly the same purpose as do the ribs of 54. It will be appreciated by those skilled in the art that the arrangement of the third and fourth embodiments could be combined to double or otherwise modify the number of longitudinally extending ribs for greater control of the stretching of the base portion 28 relative to the sidewall portion 24.

Figure 32:
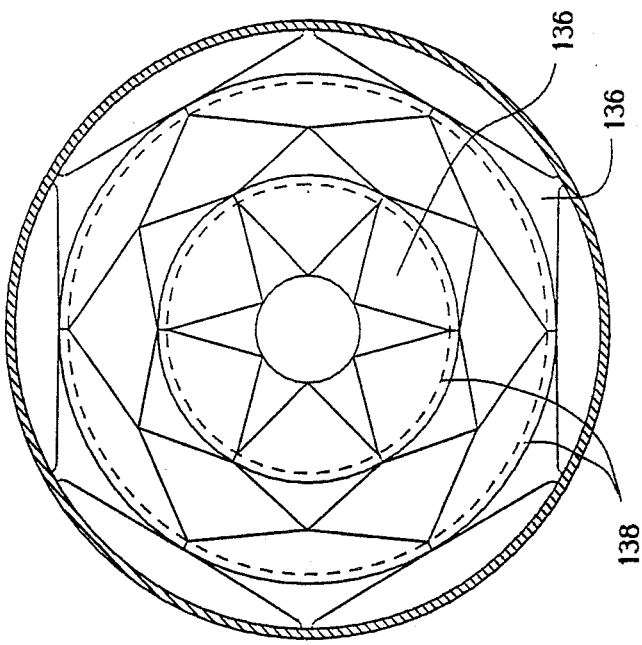
FIG. 32 is a sectional plan view of a bottle made from a preform in accordance with a fifth embodiment of the present invention taken on a section line similar to section line 4—4 of FIG. 6 relative to the first embodiment.
Figure 33:
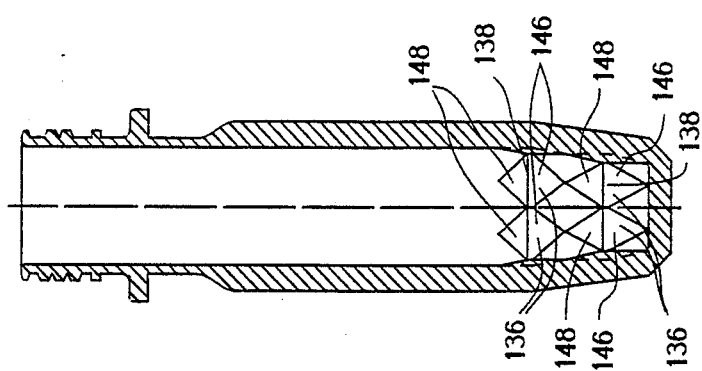
FIG. 33 is a cross-sectional elevation of the entire preform of the fifth embodiment of the present invention.

The fifth embodiment illustrated in FIGS. 32 and 33 involves a preform in which two tiers of filets 36 are disposed longitudinally of one another relative to the longitudinal axis 42 of the preform. By this design two spaced concentric reinforcement rings 138 are formed in a bottle blown from the preform thereby allowing greater flexibility of bottle design and potentially greater material savings.

Figure 34:
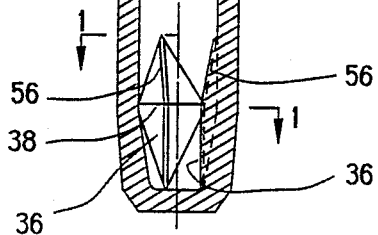
FIG. 34 is a cross-sectional elevation of the entire preform according to a sixth embodiment.
Figure 35:
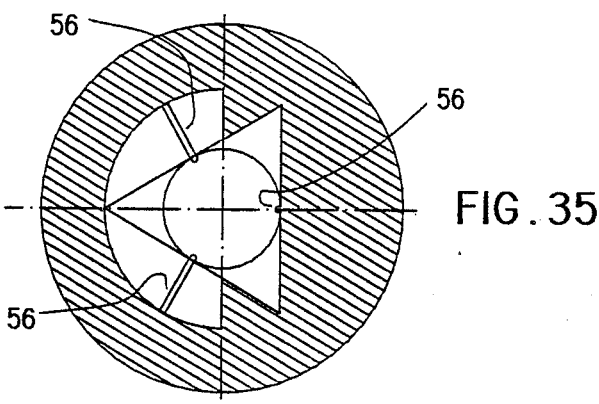
FIG. 35 is a sectional plan view on staggered section line 1—1 of FIG. 34.
Figure 36:
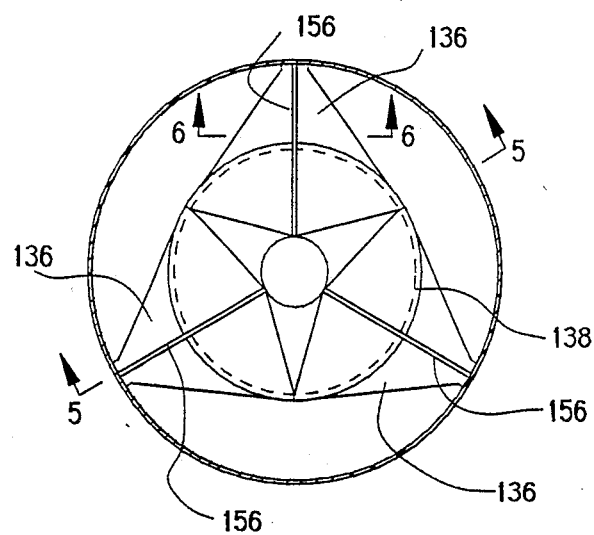
FIG. 36 is a sectional plan view of a bottle when made from a preform in accordance with the sixth embodiment taken on a section line similar to section line 4—4 of FIG. 6 relative to the first embodiment.
Figure 37:
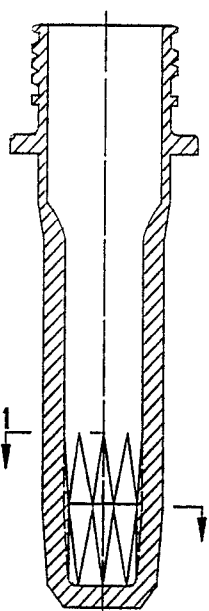
FIG. 37 is a cross-sectional elevation of the entire preform of a seventh embodiment.
Figure 40:
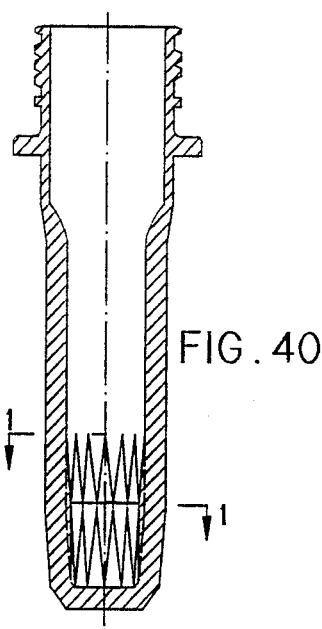
FIG. 40 is a cross-sectional elevation of the entire preform of an eighth embodiment of the present invention.
Figure 38:
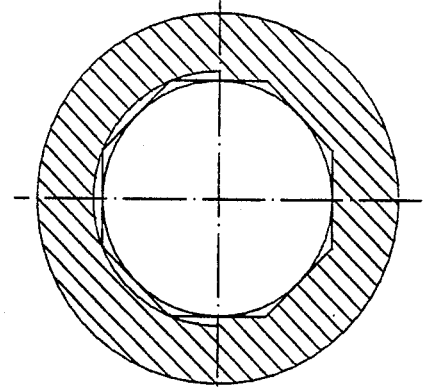
FIG. 38 is a sectional plan view on staggered section line 1—1 of FIG. 37.
Figure 41:
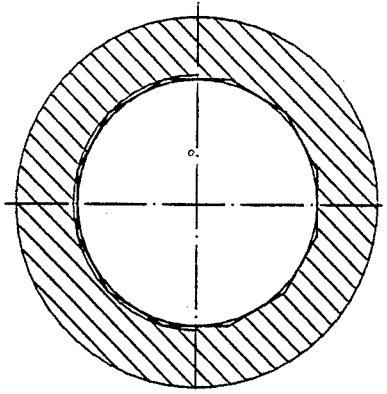
FIG. 41 is a sectional plan view on staggered section line 1—1 of FIG. 40.
Figure 39:
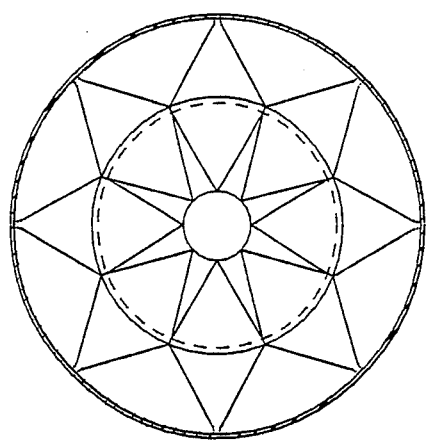
FIG. 39 is a sectional plan view of a bottle made from the preform of the seventh embodiment taken on a section line similar to section line 4—4 of FIG. 6 relative to the first embodiment.
Figure 42:
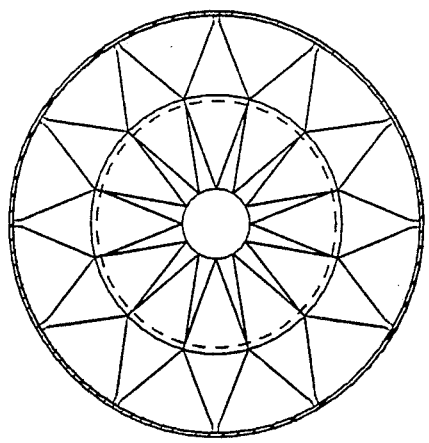
FIG. 42 is a sectional plan view of a bottle made from a preform of the eighth embodiment taken on a section line similar to section line 4—4 of FIG. 6 relative to first embodiment.
Figure 43:
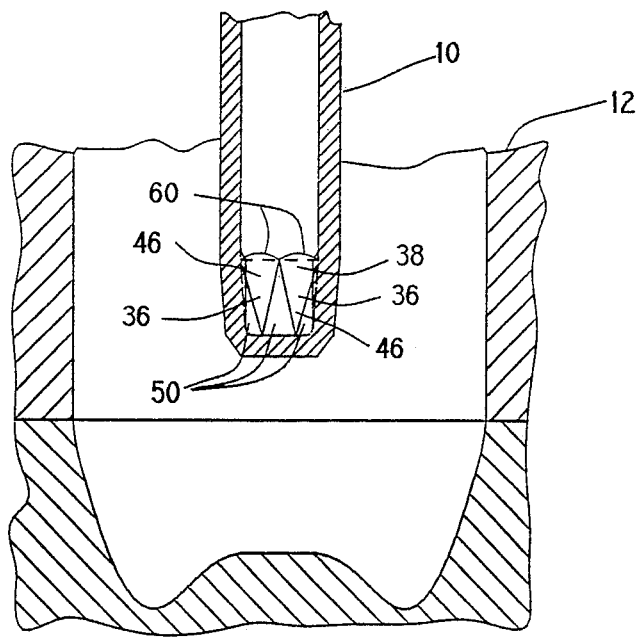
FIG. 43 is a cross-section of the base portion of a preform in accordance with a ninth embodiment of the present invention shown in the base portion of a blow mold.
Figure 44:
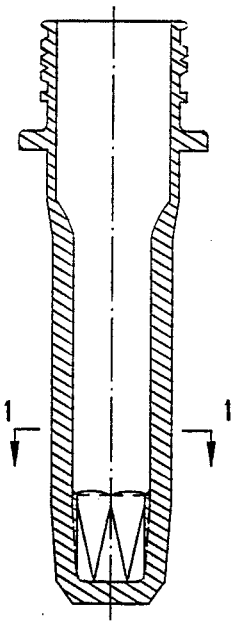
FIG. 44 is a cross-sectional elevation of the entire preform of the ninth embodiment.
Figures 45, 46, 47:
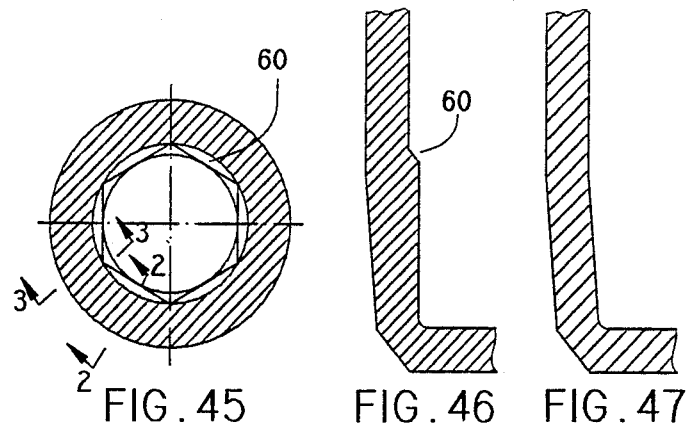
FIG. 45 is a sectional plan view on section line 1—1 of FIG. 44.
FIG. 46 is a fragmentary cross-section on section line 2—2 of FIG. 45.
FIG. 47 is a fragmentary cross-section on section line 3—3 of FIG. 45.
Figure 48:
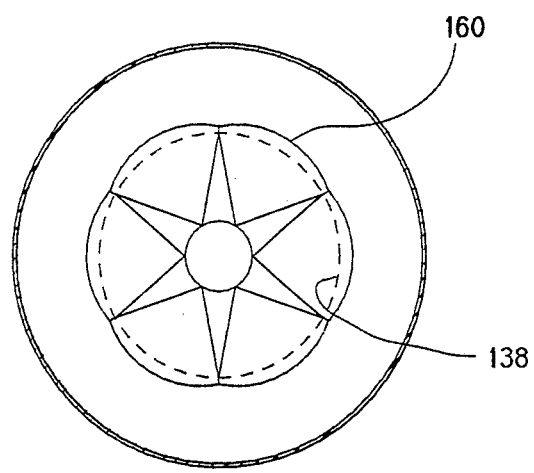
FIG. 48 is a sectional plan view of a bottle made from a preform in accordance with the eighth embodiment taken on a section line similar to section line 4—4 of FIG. 6 relative to the first embodiment.

The sixth embodiment illustrated in FIGS. 34 through 36, the seventh embodiment illustrated in FIGS. 37 through 39 and the eighth embodiment illustrated in FIGS. 40 through 42 illustrate variations of the preform and bottle of the earlier described embodiments all of which utilized a symmetrical arrangement of six filets 36. The sixth, seventh and eighth embodiments disclose arrangements for 3, 8 and 12 filets, respectively. Apart from the different numbers of filets involved, it will be appreciated by those skilled in the art that within the limits imposed by machining of core pin and the need to provide sufficient extra material to produce an effective triangulation in the geodesic reinforcement ring, the number of filets may be varied as desired. However, it is believed that a preferred range of numbers of filets is from 3 to 12 filets symmetrically arranged about the axis 42 of the preform and that for half-liter bottles, the preferred number of filets is six.

The ninth embodiment of the invention is illustrated in FIGS. 43 through 48. In this embodiment, the triangular surfaces 48 are eliminated in favor of a curved surface 60 by way of which the triangular surfaces 46 are joined to the interior wall face 35 of the preform in an area of the base portion extending toward the transition with the sidewall portion 24. The curved surface 60 comprises six surfaces, one for each filet 36 which are exposed toward the neck portion 16 and which are suitable, if desired, to be contacted by a stretch rod to selectively stretch the sidewall portion in preparation for the blowing operation whereby the stretch rod will, upon its extension into the blow mold, stretch the sidewall as desired without significant stretching of the base portion 28.

Figure 50:
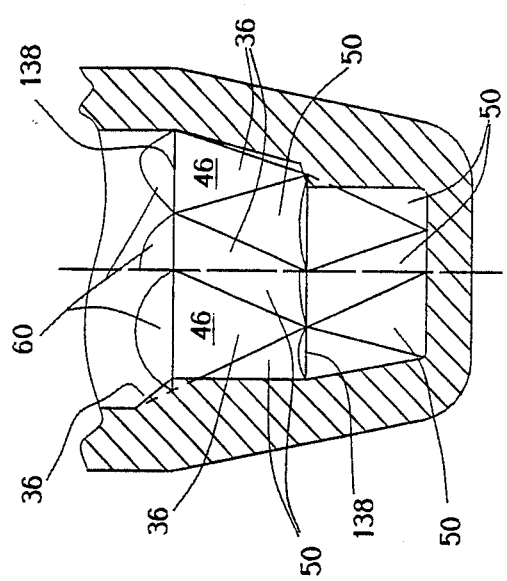
FIG. 50 is a fragmentary sectional elevation on section line 50—50 of FIG. 49.
Figure 49:
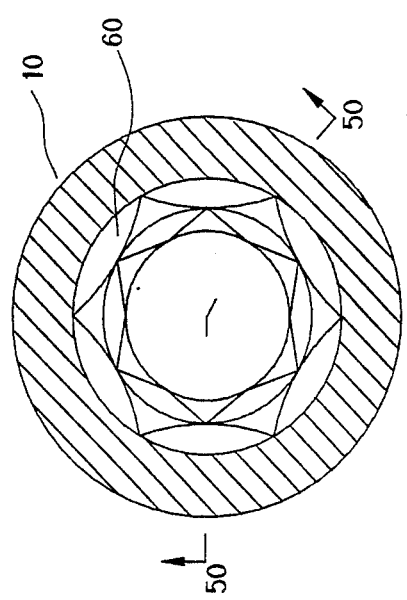
FIG. 49 is a sectional plan view of a preform of a tenth embodiment of the present invention.
Figure 52:
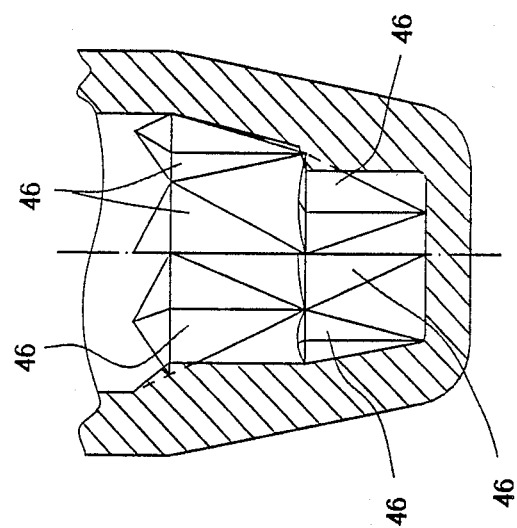
FIG. 52 is a fragmentary sectional elevation on section line 52—52 of FIG. 51.
Figure 51:
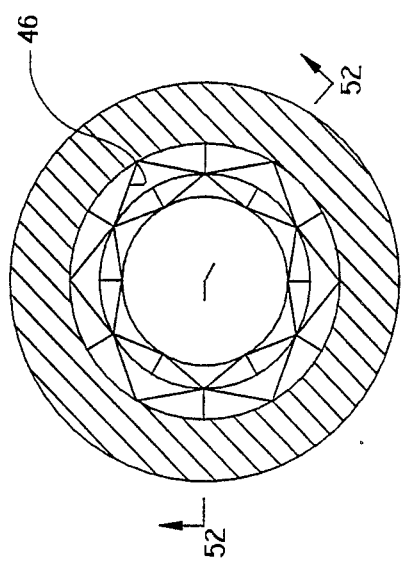
FIG. 51 is a sectional plan view of a preform of an eleventh embodiment of the present invention.

The tenth embodiment of the invention is illustrated in FIGS. 49 and 50. In this embodiment, the triangular surfaces 48 are eliminated in favor of a curved surface 60 by way of which the triangular surfaces 46 are joined to the interior wall face 35 of the preform in an area of the base portion extending toward the transition with the sidewall portion 24. The curved surface 60 comprises six surfaces, one for each fillet 36, which are exposed toward the neck portion 16 and which are suitable, if desired, to be contacted by a stretch rod to selectively stretch the sidewall portion in preparation for the blowing operation whereby the stretch rod will, upon its extension into the blow mold, stretch the sidewall as desired without significant stretching of the base portion 28. In this embodiment, two tiers of fillets 36 are disposed longitudinally of one another relative to the longitudinal axis 42 of the preform. By this design, two spaced concentric reinforcement rings 138 are formed in a bottle blown from the preform thereby allowing greater flexibility of bottle design and potentially greater material savings In this embodiment, the fillets of the two tiers are circumferentially offset from one another by half of the angles subtended by each fillet 36 so that the triangular point of each fillet of the tier closest to the neck of the preform meets the reinforcement ring 38 between the two tiers at junctions between the fillets of the tier of fillets adjacent the closed end of the preform. Additionally, this embodiment illustrates the option of providing additional reinforcement by forming the faces 46 as convex faces to increase the depth of material of the fillets at the reinforcement rings they create at the center of the angles subtended for each fillet.

Figure 53:
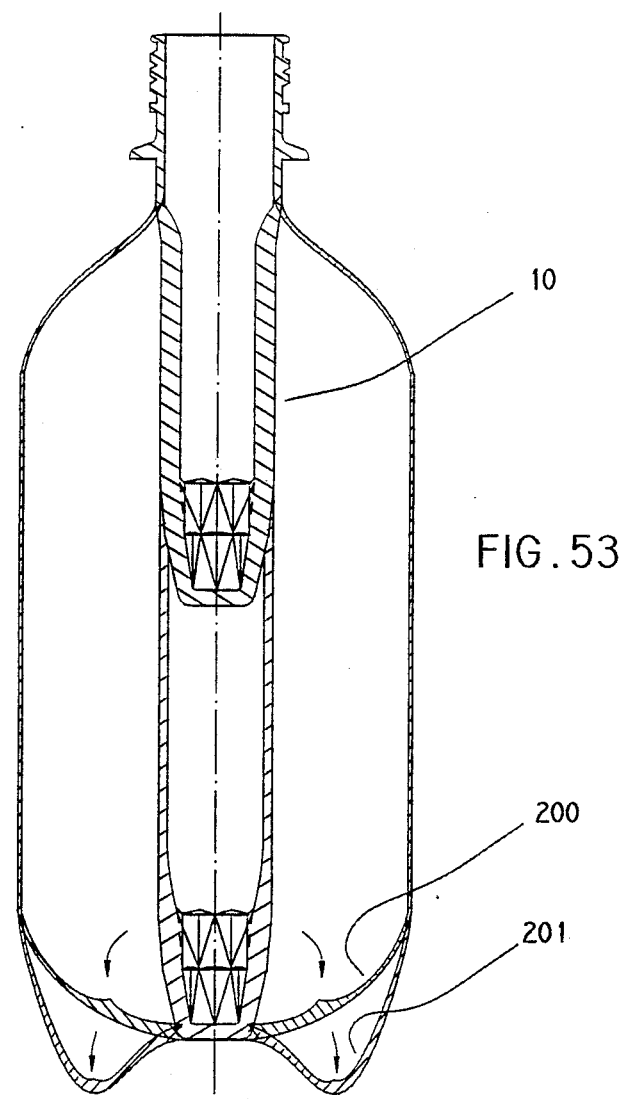
FIG. 53 is a composite diagrammatic sectional elevation showing the transformation of a preform of the eleventh embodiment into a bottle by first stretching the preform and then blowing that preform to form a bottle.

The eleventh embodiment of the invention is illustrated in FIGS. 51 through 54. This embodiment is quite similar to that described with reference to the tenth embodiment differing substantially only in that the faces 46 are folded to increase the depth of material at the center of each fillet with a consequence that a central longitudinally extending fold line is centrally located in each face 46. As a result of this, the curved surface 60 also may be formed with a central fold. With reference to FIG. 53, the sequence of operations in the blow mold is illustrated with the eleventh embodiment preform first being stretched by a stretch rod (not shown) until its base is closely adjacent the innermost end of the blow mold. This stretching is carried out in a manner to stretch the sidewall of the preform without significantly stretching or deforming the base portion thereof. Once this stretching is completed, the preform is blown to unfold the base and stretch the sidewall with the base first assuming a position and shape as shown at 200 and subsequently completely being formed as shown at 201 to form a champagne base with a geodesic reinforcement forming a chime and inwardly extending area capable of resisting the unrolling stresses applied by carbonated beverages which might be contained in the bottle. The dashed lines with arrows indicate the general movement of the material from the geodesic reinforcement area to the chime area of the finished bottle. FIG. 54 illustrates the shape of the interior base of the finished bottle when blown as illustrated in FIG. 53.

Figure 57:
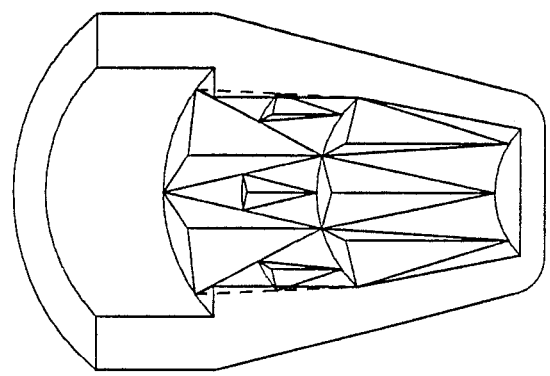
FIG. 57 is a sectional elevation of the base portion of the preform of a fourteenth embodiment of the present invention.
Figure 56:
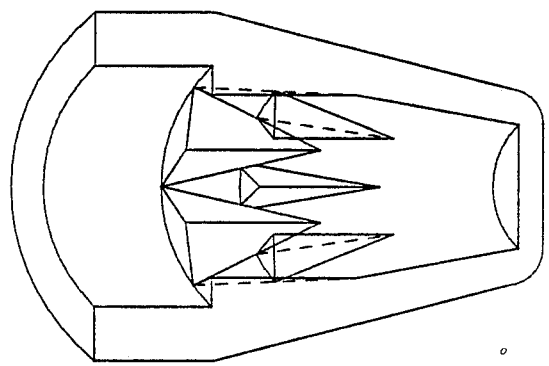
FIG. 56 is a sectional elevation of the base portion of a preform of a thirteenth embodiment of the present invention.
Figure 55:
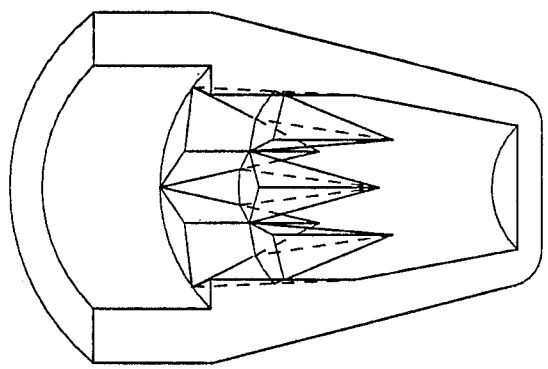
FIG. 55 is a cross-section of the base portion of the preform of a twelfth embodiment of the present invention.

The twelfth through fourteenth embodiments as illustrated in FIGS. 55, 56 and 57 have folded faces 46 much like those of the eleventh embodiment However, in these embodiments, the two tiers of fillets overlap one another to bring the reinforcement rings closer together and, in some of the embodiments, to add additional intermediate fillets to provide a third reinforcement ring. In these embodiments, the surfaces 60 are curved surfaces without the fold lines mentioned in the description relating to the eleventh embodiment.

Ignoring the ever decreasing diameter of the interior and exterior walls of the preform (which is dimensionally minor), the preform of the first embodiment for the manufacture of a half-liter bottle will have an interior diameter in the sidewall portion of 0.550 inches and an interior diameter at the closed end of 0.480 inches. The longitudinal extension of the filets 36 is approximately 1 inch. Additionally, the closed end 32 may be thinner by approximately 20 percent than the thickness of the sidewall portion 24 and the remainder of the base portion 28.

It will be appreciated that the closed end 32 need not necessarily be a substantially flat disc-like closure and that other shapes may be utilized without departing from the concept of the present invention.

Similarly, other shoulder portion designs and neck portions might be utilized as these do not play a direct part in the inventive advance provided by the present invention which advance revolves around the manner of providing a reinforcement ring based on the circumferential and longitudinal triangulation of forces of a geodesic structure in the base portion of the preform to form a reinforcement in the base of a champagne type self-standing, one-piece bottle for carbonated beverage following blowing in a blow mold. Reference to FIG. 1 will illustrate with the directional lines 62 the distribution of material from the preform to the blown bottle. This distribution results from the shape of the preform, the shape of the blow mold, the extent of the stretching of the preform in preparation for blow molding and the temperature conditioning and temperature distribution in the preform during blow molding. These are matters well-known to those skilled in the art and will not be described in detail here.

It will further be appreciated as reference to the aforementioned U.S. Pat. No. 4,785,948 will show that it will be readily apparent to a man skilled in the art that the filets could be replaced with similar reinforcing structures forming a geodesic reinforcement ring on the exterior of the preform and that such an arrangement is considered to be within the scope of the present invention. However, this is not believed to be the best mode of performing the present invention as there are many technical problems in putting such an arrangement into practical effect. These involving the problems of forming the injection mold cavity for the preform including the desirable use of a single cavity injection mold to avoid the need for the expensive and complex two-part molds which are required for example in Mankowitz, the need for corresponding shapes in the blow mold and the problems of orienting an exteriorally reinforced preform to match the shaped blow mold. Consequently, it is believed that the most practical form of the present invention involves the provision of filets 36 as described in the interior of the preform.

It will also be appreciated that while the preferred description has been made with reference to half-liter bottles, the invention is applicable to other sizes, for example, one-liter and two-liter sizes.

Figure 58:
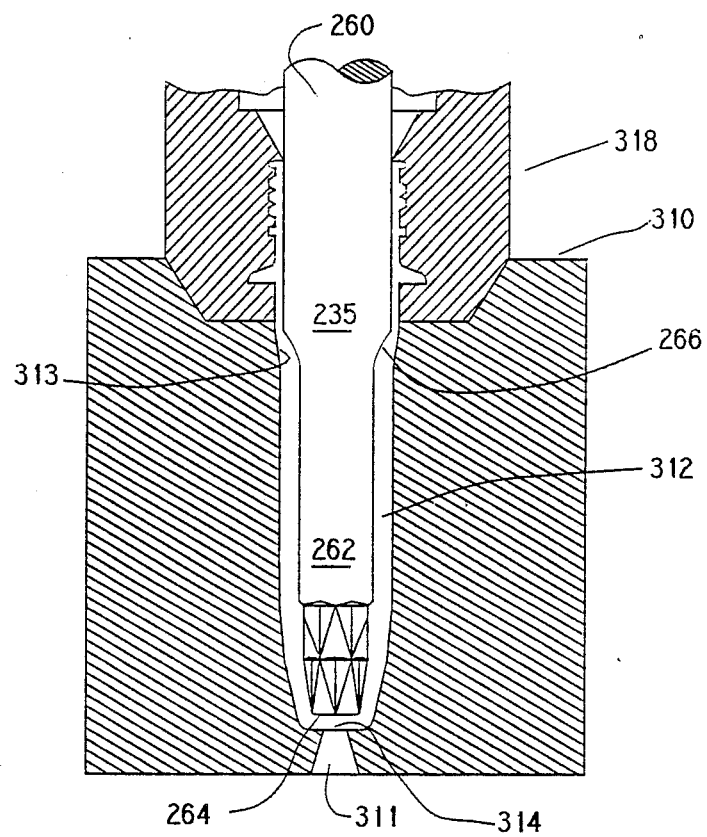
FIG. 58 illustrates a mold-core rod combination according to the present invention for injection molding a preform according to the eleventh embodiment.

Referring now to FIG. 58, there is illustrated a partable injection mold having a preform (parison) cavity 312 for molding a preform in a conventional manner through gate opening 314. The illustrated mold 310 is designed for molding a tubular preform, generally identical to the eleventh embodiment, for a container which includes a threaded neck finish 16 wherein the core rod 235 remains in place. For convenience of handling the preform, the mold 310 is provided with a split neck ring 318 to provide the threaded neck finish. Cooperating with mold 310 and split neck ring 318 for the formation of the parison is a core rod generally identified by the numeral 235. The core rod includes a base portion 260 and a core rod proper 262 having a flat end 264 which in cooperation with flat mold section 311 forms the bottom 32 of the preform 10. Additionally, the core rod includes a shoulder 266 which in cooperation with curved mold section 313 forms the shoulder portion 20 of the preform.

The geodesic faceted interior shape adjacent the base of the preform is defined by the exterior surface shape of the preform 235 adjacent its end 264.

It will be appreciated that by varying the surface shape of the mold-core rod combination, any of the embodiments of preform 10 herein described together with many variations thereof could be produced without further invention being required.

The process for manufacturing a molecularly oriented plastic bottle according to the present invention comprises the steps of (1) providing an injection molded plastic preform having a neck portion defining an opening; a tubular sidewall portion depending therefrom; and an integral base structure depending from the tubular sidewall portion to a closed end; the preform having an outside wall face and an inside wall face, with at least one of the inside wall face and the outside wall face of the base structure having integrally formed thereon a plurality of filets, extending longitudinally of the preform and contacting one another to define a continuous reinforcing ring of varying thickness spaced from the closed end and circumscribing the base structure, wherein the filets decrease progressively in width and radial thickness at least from said reinforcing ring toward said closed end, the preform being capable of forming a blow molded plastic bottle with a bottom portion having a continuous reinforcing ring of circumferentially continuous alterations in wall thickness with a regularly undulating cross-section along the circumference; (2) positioning the preform in a stretch/blow mold; and (3) stretch/blowing the preform in the blow mold to form a finished bottle. In this process the filets are preferably integral with the inside wall face, decrease progressively in width and radial thickness from the reinforcing ring toward the sidewall portion and each define two substantially triangular facets joined together to form a straight ridge at the ring, the facets substantially facing inward toward one another and being oriented to facilitate removal of the preform from a core rod during injection molding of the preform.

In this particular process the filets have only a point contact with each other between the ridges. However, they could have a line contact with each other between the ridges thereby producing a reinforcing ring having a finite width longitudinally of the axis. Also in a preferred form of the process, both the inside and outside walls of the preform taper in similar manner and the closed end thereof is substantially flat and terminates in a rapid transition to the base structure.

We claim:

1. A plastic mold-core rod combination for forming an injection molded preform for producing blow molded plastic containers which comprises: a female preform mold having an interior surface and a core rod having an exterior surface together defining a mold cavity having the shape of the preform, said preform having a neck portion defining an opening; a tubular sidewall portion depending therefrom; and an integral base structure depending from the tubular sidewall portion to a closed end; said preform having an outside wall face and an inside wall face, with at least one of the inside wall face and the outside wall face of the base structure having integrally formed thereon a plurality of filets, extending longitudinally of the preform and contacting one another to define a continuous reinforcing ring of varying thickness spaced from the closed end and circumscribing the base structure, wherein said filets decrease progressively in width and radial thickness at least from said reinforcing ring toward said closed end, the preform being capable of forming a blow molded plastic bottle with a bottom portion having a continuous reinforcing ring of circumferentially continuous alterations in wall thickness with a regularly undulating cross-section along said circumference.

2. A mold-core rod combination according to claim 1 wherein said exterior surface of said core rod is shaped to produce said filets integrally with said inside wall face.

3. A mold-core rod according to claim 2 wherein the closed end is substantially flat and terminates in a rapid transition to the base structure.

4. A mold-core rod according to claim 2 wherein said base structure has at least two pluralities of said filets disposed longitudinally of one another to form a like number of longitudinally spaced continuous reinforcing rings circumscribing the inside wall face of the base structure.

5. A mold-core rod combination according to claim 2 wherein said filets decrease progressively in width and radial thickness from said reinforcing ring toward said sidewall portion.

6. A mold-core rod combination according to claim 5 wherein said filets have only a point contact with each other between said ridges.

7. A mold-core rod combination according to claim 5 wherein said filets have a line contact with each other between said ridges thereby producing a reinforcing ring having a finite width longitudinally of said axis.

8. A mold-core rod combination according to claim 5 wherein said filets each define two substantially triangular facets joined together to form a straight ridge at said ring, said facets substantially facing inward toward one another and being oriented to facilitate removal of said preform from a core rod during injection molding of the preform.

9. A mold-core rod combination according to claim 8 wherein said inside wall face tapers inwardly from said reinforcing ring toward said closed end with adjacent portions of said filets integrally formed thereon.

10. A mold-core rod combination according to claim 9 wherein the outside wall tapers in similar manner to the taper of the inside wall.

11. A plastic mold-core rod combination for forming an injecting molded preform for producing blow molded plastic containers which comprises: a female preform mold having an interior surface and a core rod having an exterior surface together defining a mold cavity having the shape of the preform, said preform having a neck portion defining an opening; a tubular sidewall portion depending therefrom; and an integral base structure depending from the tubular sidewall portion to a closed end; said perform having an outside wall face and an inside wall face, with at least one of the inside wall face and the outside wall face of the base structure having integrally formed thereon a plurality of filets, extending longitudinally of the perform and defining a substantially continuous reinforcing ring of varying thickness spaced from the closed end and circumscribing the base structure, wherein said filets decrease progressively in width and radial thickness at least from said reinforcing ring toward said closed end, the preform being capable of forming a blow molded plastic bottle with a bottom portion having a substantially continuous reinforcing ring of circumferentially continuous alterations in wall thickness with a regularly undulating cross-section along said circumference.

* * * * *